US012531179B2

(12) United States Patent
Xu

(10) Patent No.: US 12,531,179 B2
(45) Date of Patent: Jan. 20, 2026

(54) MAGNETIC MODULE AND METHOD OF MAKING THE SAME AND ELECTRICAL CONNECTOR INCLUDING THE MAGNETIC MODULE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Yong-Chun Xu, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 1051 days.

(21) Appl. No.: 17/570,653

(22) Filed: Jan. 7, 2022

(65) Prior Publication Data

US 2022/0215999 A1 Jul. 7, 2022

(30) Foreign Application Priority Data

Jan. 7, 2021 (CN) ........................ 202110017692.0

(51) Int. Cl.
*H01F 27/28* (2006.01)
*H01F 27/24* (2006.01)
(Continued)

(52) U.S. Cl.
CPC ......... *H01F 27/2823* (2013.01); *H01F 27/24* (2013.01); *H01F 41/066* (2016.01);
(Continued)

(58) Field of Classification Search
CPC ................. H01F 27/2823; H01F 27/24; H01F 2027/2838; H01R 13/6461; H01R 13/6463
(Continued)

(56) References Cited

U.S. PATENT DOCUMENTS 2,992,386 A * 7/1961 Rosin ........................ G05F 3/06 323/308
5,929,738 A * 7/1999 Orlando .................. H01F 19/04 336/12
(Continued)

FOREIGN PATENT DOCUMENTS

CN 102832019 12/2012
CN 110164662 A * 8/2019 ............. H01F 27/29
CN 116682650 A * 9/2023 ........... H01F 27/306

*Primary Examiner* — Shawki S Ismail
*Assistant Examiner* — Joselito S. Baisa
(74) *Attorney, Agent, or Firm* — Ming Chieh Chang

(57) ABSTRACT

A magnetic module includes: a magnetic core; and plural enameled wires wound on the magnetic core, the enameled wire being wound on the magnetic core to form a primary coil and a secondary coil, the primary coil including a first group of enameled wires and a second group of enameled wires, the secondary coil including a third group of enameled wires and a fourth group of enameled wires, wherein the parts of the first group of enameled wires and the fourth group of enameled wires wound around the magnetic core are twisted together to form a first stranded wire, the parts of the second group of enameled wires and the third group of enameled wires wound around the magnetic core are twisted together to form a second stranded wire, and the first stranded wire and the second stranded wire are twisted together to form a total stranded wire.

16 Claims, 6 Drawing Sheets

(51) Int. Cl.
*H01F 41/066* (2016.01)
*H01F 41/07* (2016.01)
*H01R 13/6461* (2011.01)

(52) U.S. Cl.
CPC ......... *H01F 41/07* (2016.01); *H01R 13/6461* (2013.01); *H01F 2027/2838* (2013.01)

(58) Field of Classification Search
USPC .......................................................... 336/221
See application file for complete search history.

(56) References Cited

U.S. PATENT DOCUMENTS

| | | | | |
|---|---|---|---|---|
| 8,968,026 | B2 * | 3/2015 | Gailus | H01R 24/64 439/620.05 |
| 9,502,829 | B2 * | 11/2016 | Chen | H01F 27/2823 |
| 10,236,114 | B2 | 3/2019 | Xu et al. | |
| 10,483,697 | B2 | 11/2019 | Xu et al. | |
| 10,796,839 | B2 * | 10/2020 | Marketos | H01F 41/0206 |
| 2007/0040645 | A1 * | 2/2007 | Sedio | H01F 30/16 336/232 |
| 2011/0167869 | A1 * | 7/2011 | Geers | H01F 5/04 62/637 |
| 2012/0176756 | A1 * | 7/2012 | Gailus | H01R 24/64 361/752 |

* cited by examiner

MAGNETIC MODULE AND METHOD OF MAKING THE SAME AND ELECTRICAL CONNECTOR INCLUDING THE MAGNETIC MODULE

CROSS-REFERENCE TO RELATED APPLICATIONS

This patent application relates to U.S. patent application Ser. No. 17/476,366, filed on Sep. 15, 2021, entitled "MAGNETIC MODULE AND ELECTRICAL CONNECTOR INCLUDING THE MAGNETIC MODULE" and U.S. patent application filed on even day herewith, entitled "MAGNETIC MODULE AND ELECTRICAL CONNECTOR INCLUDING THE MAGNETIC MODULE," which are assigned to the same assignee as this application.

BACKGROUND OF THE INVENTION

1. Field of the Invention

The present invention relates generally to a magnetic module and an electrical connector including the magnetic module, and more particularly to the winding of the magnetic module. The present invention also relates to a method of making the magnetic module, and more particularly to a winding method of the magnetic module.

2. Description of Related Arts

China Patent No. 102832019 discloses a magnetic module including a magnetic core, a primary coil and a secondary coil wound on the magnetic core, each input end and output end of the primary coil and the secondary coil has two wire, and the resistance of each input end and output end is relatively large, which cannot guarantee the effective transmission of high-frequency signal transmission. However, in order to reduce the impedance, thickening the enameled wire will cause the enameled wire to have a greater tension during the winding and bending process, which will easily cause the outer layer of paint to rupture, and cause the flexibility of the enameled wire to deteriorate, which is inconvenient for winding operations.

SUMMARY OF THE INVENTION

A main object of the present invention is to provide a magnetic module suitable for high frequency signal transmission. Another main object of the present invention is to provide a manufacturing method of the magnetic module. A further main objective of the present invention is to provide an electrical connector using the magnetic module.

To achieve the above-mentioned object, a magnetic module comprises: a magnetic core; and a plurality of enameled wires wound on the magnetic core, the enameled wire being wound on the magnetic core to form a primary coil and a secondary coil, the primary coil including a first group of enameled wires and a second group of enameled wires, the secondary coil including a third group of enameled wires and a fourth group of enameled wires, wherein the respective parts of the first group of enameled wires and the fourth group of enameled wires wound around the magnetic core are twisted together to form a first stranded wire, the respective parts of the second group of enameled wires and the third group of enameled wires wound around the magnetic core are twisted together to form a second stranded wire, and the first stranded wire and the second stranded wire are twisted together to form a total stranded wire.

To achieve the above-mentioned object, a manufacturing method of a magnetic module comprises the steps of: providing a magnetic core; providing a plurality of enameled wires; dividing the enameled wires into a first group of enameled wires, a second group of enameled wires, a third group of enameled wires, and a fourth group of enameled wires, the first group of enameled wires and the second group of enameled wires being wound on the magnetic core to form a primary coil, the third group of enameled wires and the fourth group of enameled wires being wound on the magnetic core to form a secondary coil, wherein the first group of enameled wires and the fourth group of enameled wires are twisted to form a first stranded wire; the second group of enameled wires and the third group of enameled wires are twisted to form a second stranded wire; and the first strand and the second strand together are twisted to form a total strand wire.

To achieve the above-mentioned object, an electrical connector comprises a magnetic module, the magnetic module comprising: a magnetic core; and a plurality of enameled wires wound on the magnetic core, the enameled wire being wound on the magnetic core to form a primary coil and a secondary coil, the primary coil including a first group of enameled wires and a second group of enameled wires, the secondary coil including a third group of enameled wires and a fourth group of enameled wires, wherein the respective parts of the first group of enameled wires and the fourth group of enameled wires wound around the magnetic core are twisted together to form a first stranded wire, the respective parts of the second group of enameled wires and the third group of enameled wires wound around the magnetic core are twisted together to form a second stranded wire, and the first stranded wire and the second stranded wire are twisted together to form a total stranded wire.

Compared to prior art, the respective parts of the first group of enameled wires and the fourth group of enameled wires wound around the magnetic core are twisted together to form a first stranded wire, the respective parts of the second group of enameled wires and the third group of enameled wires wound around the magnetic core are twisted together to form a second stranded wire, and the first stranded wire and the second stranded wire are twisted together to form a total stranded wire. Through the combination and process design of the twisted wire, a better high-frequency characteristics to ensure effective transmission of high-frequency signals may be achieved.

DETAILED DESCRIPTION OF THE PREFERRED EMBODIMENT

Figure 1:
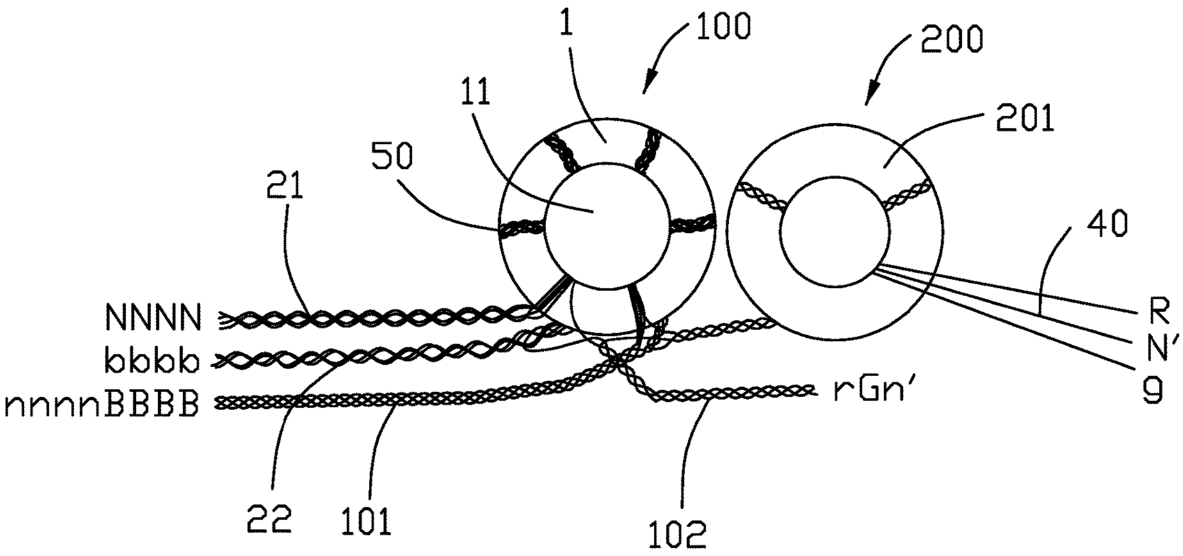
FIG. 1 is a schematic diagram of magnetic module in accordance with the present invention and common mode choke coil connected with it.
Figure 2:
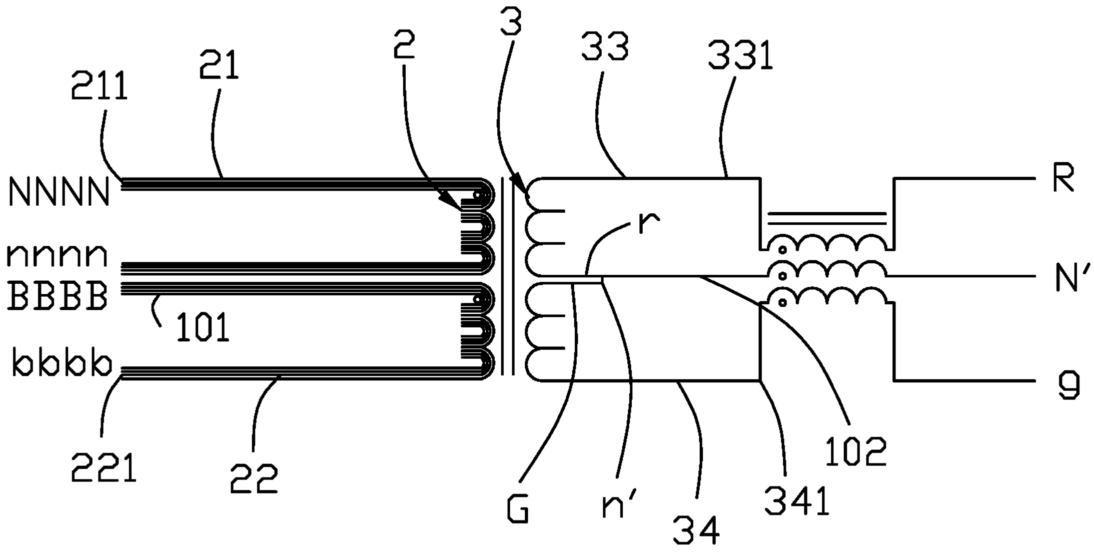
FIG. 2 is a circuit schematic of magnetic module and the common mode choke coil connected to it in FIG. 1.
Figure 3:
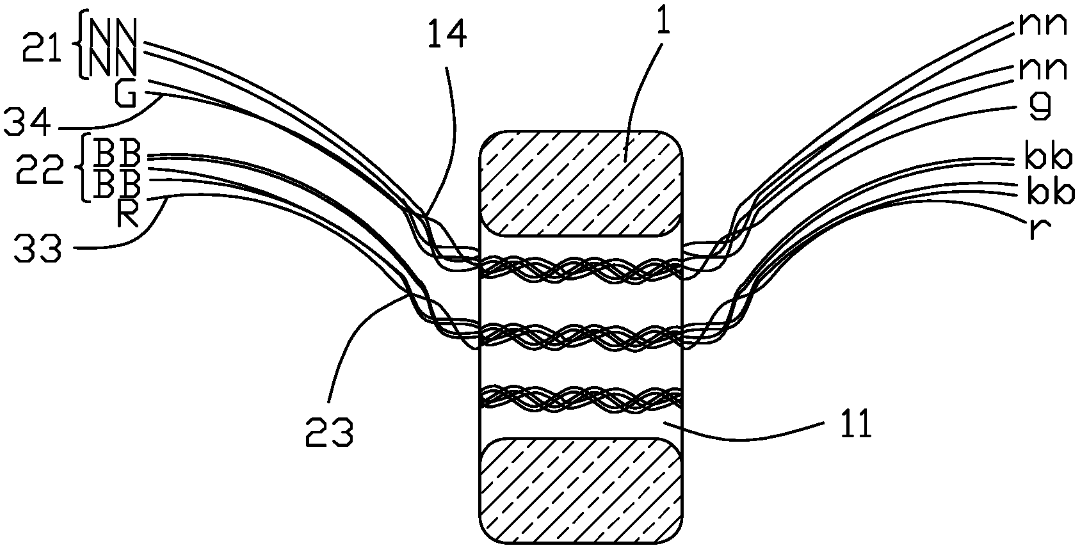
FIG. 3 is a schematic diagram of the wire ends spreading out after the magnetic module is wound in FIG. 1.
Figure 4:
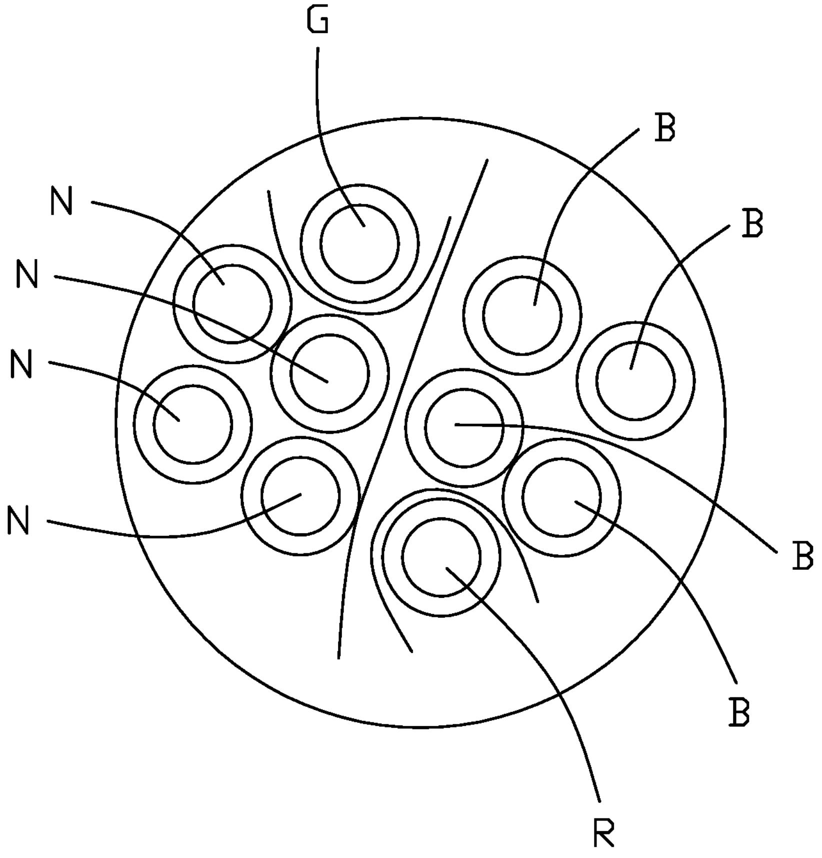
FIG. 4 is a schematic diagram of the first embodiment of the arrangement structure of the enameled wire of the magnetic module in accordance with the present invention.

Referring to FIGS. 1-4, the first embodiment of a magnetic module 100 in accordance with the present invention is shown. The magnetic module 100 is actually a transformer. The magnetic module 100 includes a toroid or magnetic core 1 and a plurality of enameled wires wound on the magnetic core 1. The enameled wires are wound on the magnetic core 1 to form a primary coil 2 and a secondary coil 3.

The magnetic core 1 has a circular ring shape with a central through hole or an oval shape with two through holes. Specifically, in this embodiment, the magnetic core 1 is a toroidal magnetic core 1 provided with a central through hole 11. The primary coil 2 includes a first group of enameled wires 21 and a second group of enameled wires 22. The first group of enameled wires 21 and the second group of enameled wires 22 respectively form the primary input end 211 and the primary output end 221 of the primary coil 2, and a primary center tap 101 is formed between the primary input end 211 and the primary output end 221. The secondary coil 3 includes a third group of enameled wires 33 and a fourth group of enameled wires 34. The third group of enameled wires 33 and the fourth group of enameled wires 34 respectively form the secondary input end 331 and the secondary output end 341 of the secondary coil 3, and form the secondary center tap 102. The tail end of the second center tap 102 is immersed in tin and short-circuited.

The diameter of each enameled wire of the first group of enameled wires 21, the second group of enameled wires 22, the third group of enameled wires 33, and the fourth group of enameled wires 34 ranges from AWG 42 to AWG 35. Specifically, in this embodiment, the diameter of each enameled wire is AWG 40. The respective parts of the first group of enameled wires 21 and the fourth group of enameled wires 34 wound around the magnetic core 1 are twisted together to form a first stranded wire 14. The respective parts of the second group of enameled wires 22 and the third group of enameled wires 33 wound around the magnetic core 1 are twisted together to form a second stranded wire 23. The first strand 14 and the second strand 23 are twisted together to form a total strand 50. The total stranded wire 50 is wound around the magnetic core 1 in a manner that penetrates the central through hole 11 and exposes the end of each enameled wire.

In this embodiment, each of the first group of enameled wires 21 and the second group of enameled wires 22 has four enameled wires, and each of the third group of enameled wires 33 and the fourth group of enameled wires 34 has only one enameled wire. The range of the twisting degree of the first stranded wire 14, the second stranded wire 23 and the total stranded wire 50 are all 0-35 strands per inch. Specifically, in this embodiment, the twisting degree of the first stranded wire 14, the second stranded wire 23 and the total stranded wire 50 are all 10 strands per inch.

In another embodiment of the present invention, the first group of enameled wires 21 are twisted together and then twisted with the fourth group of enameled wires 34 to form a first stranded wire 14. The second group of enameled wires 22 are twisted together and then twisted with the third group of enameled wires 33 to form a second stranded wire 23. The range of the twisting degree of the first group of enameled wires 21, the second group of enameled wires 22, the first stranded wires 14, the second stranded wires 23 and the total stranded wires 50 are all 0-35 twists/inch. Specifically, the twisting degree of the first group of enameled wires 21 and the second group of enameled wires 22 are both 10 stranded/inch, and the twisting degrees of the first stranded wires 14, the second stranded wires 23 and the total stranded wires 50 are all 8 stranded/inch. The magnetic module 100 can support 6.25 Gbps signal transmission.

Each enameled wire has a first thread and a second thread. The first group of enameled wire 21 is natural. Each enameled wire in the first group of enameled wires 21 comprises a first thread N and a second thread n. The second group of enameled wire 22 is blue. Each enameled wire in the second group of enameled wires 22 comprises a first thread B and a second thread b. The third group of enameled wire 33 is red. Each enameled wire in the third group of enameled wires 33 comprises a first thread R and a second thread r. The fourth group of enameled wire 34 is green. Each enameled wire in the fourth group of enameled wires 34 comprises a first thread G and a second thread g. The color of the enameled wire is just for easy distinction, and other colors can also be used instead.

The first thread NNNN of the four enameled wires of the first group of enameled wires 21 collectively serves as the primary input end 211 of the primary coil 2 of the transformer. The second thread nnnn of the first group of enameled wires 21 and the first thread BBBB of the second group of enameled wires 22 together form the first center tap 101. The second thread bbbb of the four enameled wires of the second group of enameled wires 22 are collectively used as the primary output end 221 of the primary coil 2 of the transformer. The first thread R of the enameled wire of the third group of enameled wires 33 is used as the secondary input end 331 of the transformer secondary coil 3. The second thread g of the fourth group of enameled wire 34 is the secondary output end 341 of the transformer secondary coil 3. The second thread r of the third group of enameled wires 33 and the first thread G of the fourth group of enameled wires 34 together form the second center tap 102. The first center tap 101 is twisted into one bundle, and the second center tap 102 is twisted into another bundle.

The magnetic module 100 also includes a common mode choke 200. The common mode choke coil 200 includes common mode core 201. A natural enameled wire 40 is added and the natural enameled wire 40 includes the first thread N' and the second thread n'. The natural wire 40 is twisted with the third group of enameled wires 33 and the fourth group of enameled wires 34 and then wound around the common mode core 201 to form windings RgN' and rGn'.

Figure 5:
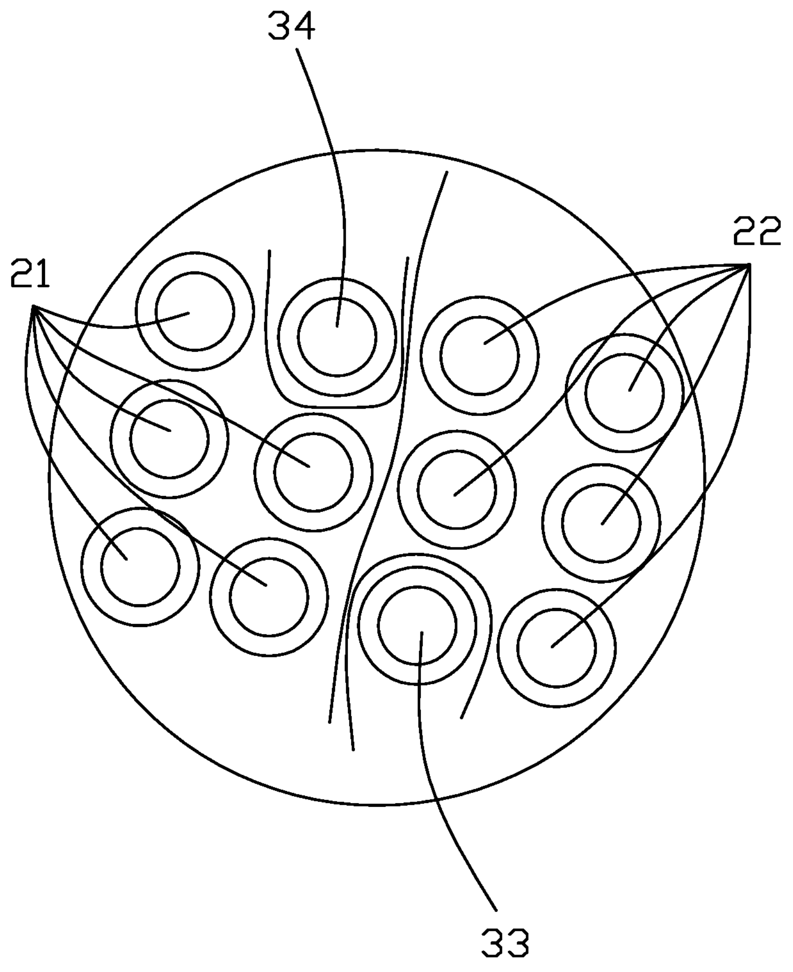
FIG. 5 is a schematic diagram of the second embodiment of the arrangement structure of the enameled wire of the magnetic module in accordance with the present invention.
Figure 6:
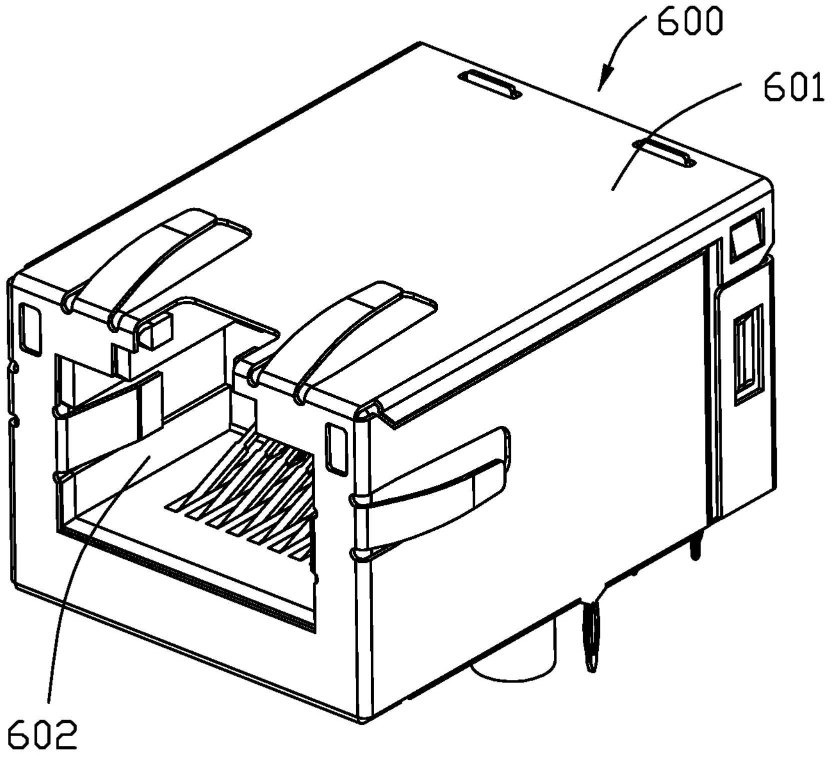
FIG. 6 is a perspective view of an electrical connector including the magnetic module in FIG. 1.

Referring to FIG. 5, a schematic diagram of the second embodiment of the enameled wire arrangement of the magnetic module 100 in accordance with the present invention is shown. Compared with the previous embodiment, in this embodiment, each of the first group of enameled wires 21 and the second group of enameled wires 22 has five enameled wires, and each of the third group of enameled wires 33 and the fourth group of enameled wires 34 has only one enameled wire Referring to FIG. 6, an electrical connector 600 in accordance with the present invention includes a housing 601, an insulating body 602 housed in the housing 601, and a magnetic module 100 housed in the housing 601. The electrical connector 600 includes four magnetic modules 100, and the electrical connector 600 can support 25 Gbps signal transmission.

The manufacturing method of the magnetic module 100 of the present invention includes the following steps: providing the magnetic core 1; providing a plurality of enameled wires; dividing the enameled wires into a first group of enameled wires 21, a second group of enameled wires 22, a third group of enameled wires 33, and a fourth group of enameled wires 34; winding the first group of enameled wires 21 and the second group of enameled wires 22 around the magnetic core 1 to form a primary coil 2 and winding the third group of enameled wires 33 and the fourth group of enameled wires 34 around the magnetic core 1 to form a secondary coil 3; twisting the first group of enameled wires 21 and the fourth group of enameled wires 34 to form the first stranded wire 14; twisting the second group of enameled wires 22 and the third group of enameled wires 33 to form the second stranded wire 23; and twisting the first stranded wire 14 and the second stranded wire 23 to form a total stranded wire 50.

During manufacturing the magnetic module 100, the respective parts of the first group of enameled wires 21 wound around the magnetic core 1 may be twisted together, and then twisted with the fourth group of enameled wires 34 to form the first stranded wire 14, and the respective parts of the third group of enameled wires 33 can be twisted together, and then twisted with the second group of enameled wires 22 to form a second stranded wire 23.

In the present invention, the respective parts of the first group of enameled wires 21 and the fourth group of enameled wires 34 wound around the magnetic core 1 are twisted together to form a first stranded wire 14. The respective parts of the second group of enameled wires 22 and the third group of enameled wires 33 wound around the magnetic core 1 are twisted together to form a second stranded wire 23. The first strand 14 and the second strand 23 are twisted together to form a total strand 50. The magnetic module of the present invention is designed through the special combination and process design of the twisted wire, and the multi-strand twisted wire makes it have lower impedance and higher inductance, so as to achieve better high-frequency characteristics, such as insertion loss, reflection loss, and crosstalk are smaller, especially the reflection loss is small, to meet the purpose of high-frequency signals.

What is claimed is:

1. A magnetic module comprising:

a magnetic core; and a plurality of enameled wires wound on the magnetic core, the enameled wire being wound on the magnetic core to form a primary coil and a secondary coil, the primary coil including a first group of enameled wires and a second group of enameled wires, the secondary coil including a third group of only one enameled wire and a fourth group of only one enameled wire, wherein the respective parts of the first group of enameled wires and the fourth group of only one enameled wire wound around the magnetic core are twisted together to form a first stranded wire, the respective parts of the second group of enameled wires and the third group of only one enameled wire wound around the magnetic core are twisted together to form a second stranded wire, and the first stranded wire and the second stranded wire are twisted together to form a total stranded wire;

the first group of enameled wires and the second group of enameled wires respectively form an input end, an output end of the primary coil, and a secondary center tap, the third group of only one enameled wire and the fourth group of only one enameled wire respectively form an input end, an output end of the secondary coil, and a secondary center tap; and each of the first group of enameled wires and the second group of enameled wires has four enameled wires.

2. The magnetic module as claimed in claim 1, wherein the diameters of the enameled wires of the first group of enameled wires, the second group of enameled wires, the third group of only one enameled wire, and the fourth group of only one enameled wire are the same, and the diameters range is between AWG 42 to AWG 35.

3. The magnetic module as claimed in claim 2, wherein the diameter of each enameled wire is AWG 40.

4. The magnetic module as claimed in claim 3, wherein the twisting degree of the first stranded wire, the second stranded wire, and the total stranded wire are all in the range of 0-35 twists/inch.

5. The magnetic module as claimed in claim 4, wherein the twisting degree of the first stranded wire, the second stranded wire, and the total stranded wire are all 10 twists/inch.

6. The magnetic module as claimed in claim 4, wherein the first group of enameled wires are twisted together and then twisted with the fourth group of only one enameled wire, and the second group of enameled wires are twisted together and then twisted with the third group of only one enameled wire.

7. The magnetic module as claimed in claim 6, wherein the range of the twisting degree of the first group of enameled wires, the second group of enameled wires, the first stranded wire, the second stranded wire, and the total stranded wire are all 0-35 twists/inch.

8. The magnetic module as claimed in claim 7, wherein the twisting degree of the first group of enameled wires and the second group of enameled wires are both 10 twists/inch, and the twisting degree of the first stranded wire, the second stranded wire, and the total stranded wire are all 8 twists/inch.

9. A magnetic module comprising:

a magnetic core; and a plurality of enameled wires wound on the magnetic core, the enameled wire being wound on the magnetic core to form a primary coil and a secondary coil, the primary coil including a first group of enameled wires and a second group of enameled wires, the secondary coil including a third group of only one enameled wire and a fourth group of only one enameled wire, wherein the respective parts of the first group of enameled wires and the fourth group of only one enameled wire wound around the magnetic core are twisted together to form a first stranded wire, the respective parts of the second group of enameled wires and the third group of only one enameled wire wound around the magnetic core are twisted together to form a second stranded wire, and the first stranded wire and the second stranded wire are twisted together to form a total stranded wire;

the first group of enameled wires and the second group of enameled wires respectively form an input end, an output end of the primary coil, and a secondary center tap, the third group of only one enameled wire and the fourth group of only one enameled wire respectively form an input end, an output end of the secondary coil, and a secondary center tap; and each of the first group of enameled wires and the second group of enameled wires has five enameled wires.

10. The magnetic module as claimed in claim 9, wherein the diameters of the enameled wires of the first group of enameled wires, the second group of enameled wires, the third group of only one enameled wire, and the fourth group of only one enameled wire are the same, and the diameters range is between AWG 42 to AWG 35.

11. The magnetic module as claimed in claim 10, wherein the diameter of each enameled wire is AWG 40.

12. The magnetic module as claimed in claim 11, wherein the twisting degree of the first stranded wire, the second stranded wire, and the total stranded wire are all in the range of 0-35 twists/inch.

13. The magnetic module as claimed in claim 12, wherein the twisting degree of the first stranded wire, the second stranded wire, and the total stranded wire are all 10 twists/inch.

14. The magnetic module as claimed in claim 12, wherein the first group of enameled wires are twisted together and then twisted with the fourth group of only one enameled wire, and the second group of enameled wires are twisted together and then twisted with the third group of only one enameled wire.

15. The magnetic module as claimed in claim 14, wherein the range of the twisting degree of the first group of enameled wires, the second group of enameled wires, the first stranded wire, the second stranded wire, and the total stranded wire are all 0-35 twists/inch.

16. The magnetic module as claimed in claim 15, wherein the twisting degree of the first group of enameled wires and the second group of enameled wires are both 10 twists/inch, and the twisting degree of the first stranded wire, the second stranded wire, and the total stranded wire are all 8 twists/inch.

* * * * *